United States Patent [19]

Teuchert et al.

[11] Patent Number: 5,051,230
[45] Date of Patent: Sep. 24, 1991

[54] NUCLEAR REACTOR OF A BALL-BED TYPE FOR BATCH-WISE USE OF CORE FUEL BALLS REPLACED BY A NEW BATCH AT RELATIVELY LONG INTERVALS

[76] Inventors: Eberhardt Teuchert, Franziskusstr. 2, D-5170 Jülich; Klaus-Arne Haas, Münsterweg 4, D-5160 Düren; Helmut Gerwin, Otto-Hahn-Str. 3, D-5170 Jülich, all of Fed. Rep. of Germany

[21] Appl. No.: 432,340

[22] Filed: Nov. 6, 1989

Related U.S. Application Data

[60] Continuation of Ser. No. 279,312, Dec. 1, 1988, abandoned, which is a continuation of Ser. No. 18,406, Feb. 25, 1987, abandoned, which is a division of Ser. No. 777,353, Sep. 18, 1985, Pat. No. 4,695,423.

[51] Int. Cl.$^5$ .......................................... G21C 19/00
[52] U.S. Cl. ................................... 376/381; 376/458
[58] Field of Search ............... 376/265, 381, 382, 267, 376/214, 458, 459

[56] References Cited

U.S. PATENT DOCUMENTS

| | | | |
|---|---|---|---|
| 2,910,416 | 10/1959 | Daniels | 376/265 |
| 3,010,888 | 11/1961 | Battle | 376/459 |
| 3,262,859 | 7/1966 | Winsche | 376/381 |
| 3,294,645 | 12/1966 | Susskind et al. | 376/265 |
| 3,336,203 | 8/1967 | Rausch et al. | 376/265 |
| 3,632,472 | 1/1972 | Pettinger | 376/459 |
| 4,152,204 | 5/1979 | Maly et al. | 376/381 |
| 4,199,405 | 4/1980 | Schweiger | 376/458 |
| 4,356,145 | 10/1982 | Brandes et al. | 376/265 |
| 4,383,325 | 5/1983 | Naujoks et al. | 376/381 |
| 4,654,189 | 3/1987 | Schoening et al. | 376/265 |
| 4,695,423 | 9/1987 | Teuchert et al. | 376/265 |

FOREIGN PATENT DOCUMENTS

| | | | |
|---|---|---|---|
| 2851915 | 6/1979 | Fed. Rep. of Germany | 376/458 |
| 3048601 | 7/1982 | Fed. Rep. of Germany | 376/458 |
| 3114318 | 10/1982 | Fed. Rep. of Germany | 376/381 |
| 0217191 | 12/1984 | Japan | 376/458 |
| 2071895 | 4/1987 | Japan | 376/265 |

OTHER PUBLICATIONS

"Questions of Atomic Science and Technology", Published in Moscow, 1984, pp. 40 & 41.

Primary Examiner—Daniel D. Wasil

[57] ABSTRACT

A ball-bed (pebble-bed) nuclear reactor, instead of having fuel elements more or less continuously withdrawn and new or reconstituted fuel elements more or less continuously reintroduced, is initially partly filled with fuel balls of which two-thirds have a fissionable material content 12% below and the upper third 24% higher than the average content. This filling meets the requirements of criticality in order to begin operation. Thereafter, fuel balls are added slowly, a few hundred per day, having 150 to 250% of the average fissionable material content of the initial loading thus preserving the criticality requirements, while keeping the temperature within safe limits until the reactor cavern is filled. Thereafter the reactor is shut down, cooled off, pressure relieved and emptied, the last step typically from above. An ordered array of the fuel balls in regular layers avoids excess pressure loads on the reflector over the life time of the filling. For a random packing of the balls of a cross-section of the cavern that increases somewhat from the bottom upwards also avoids the excess pressure loads on the reflector.

29 Claims, 8 Drawing Sheets

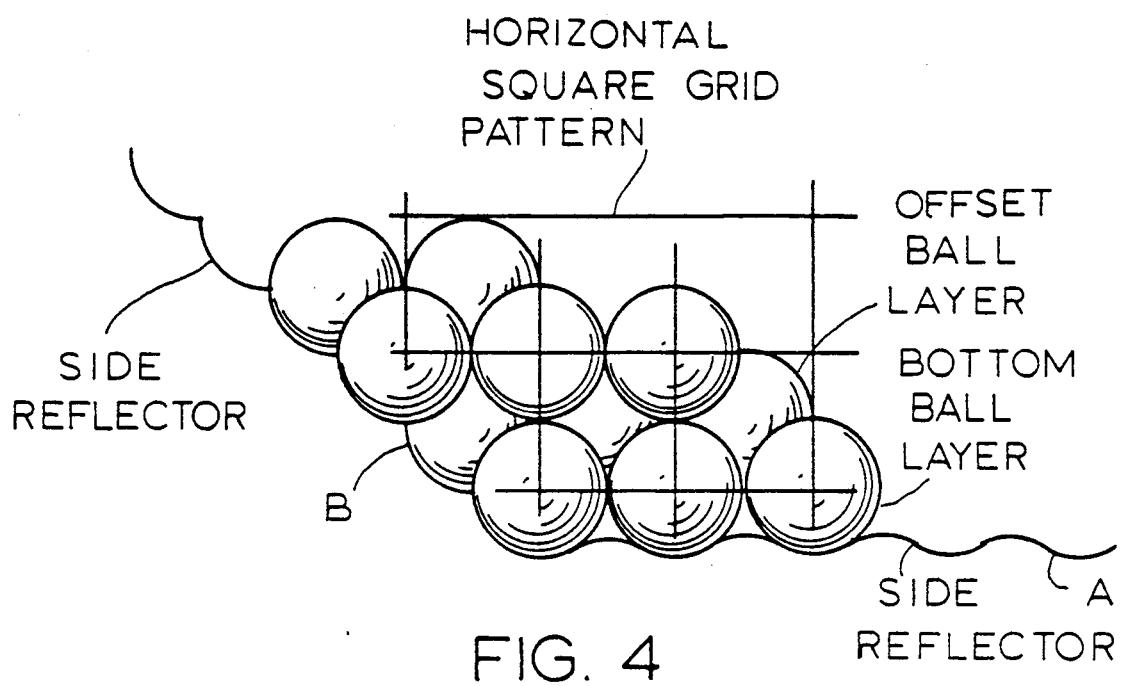
FIG. 4
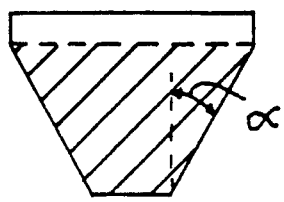 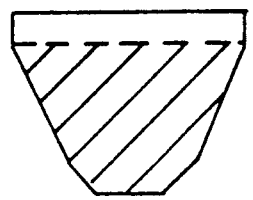 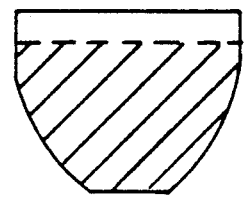
FIG. 5a    FIG. 5b    FIG. 5c

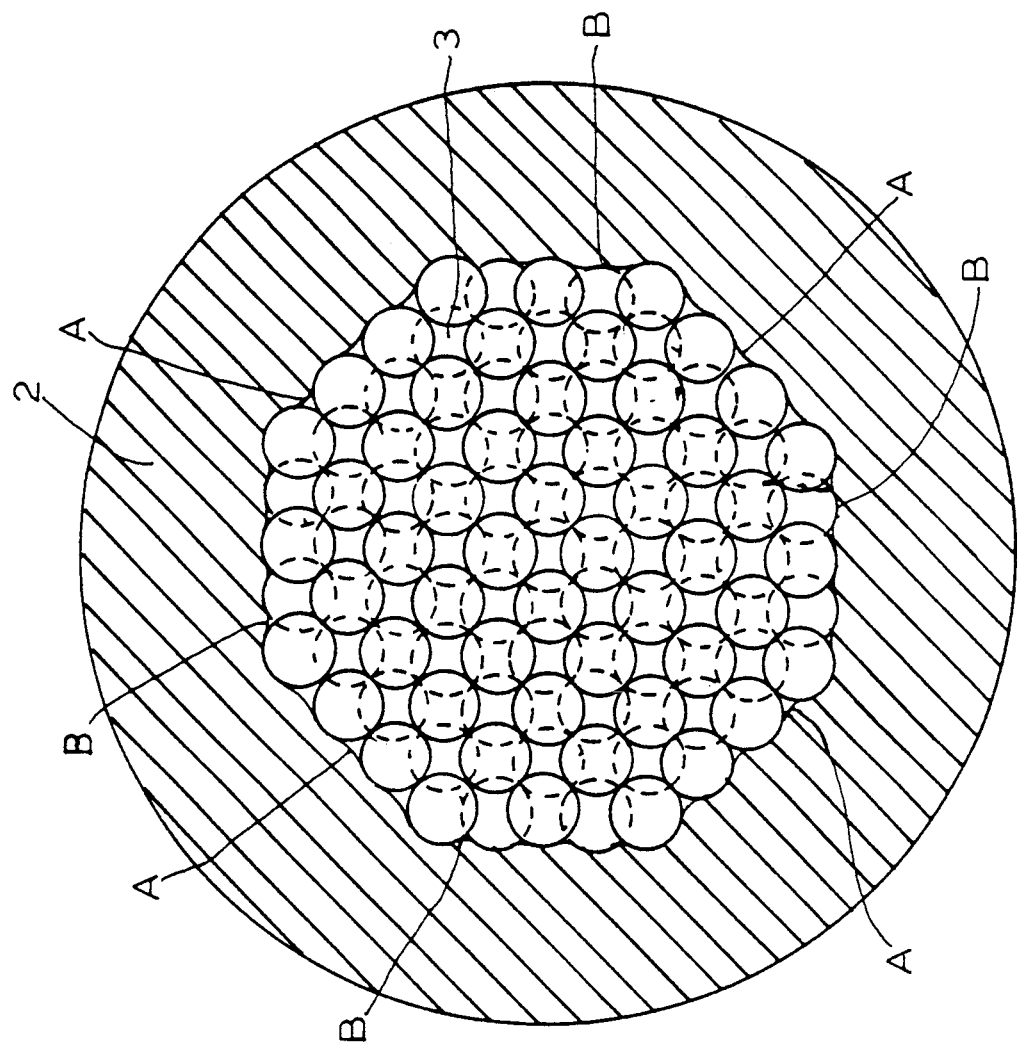

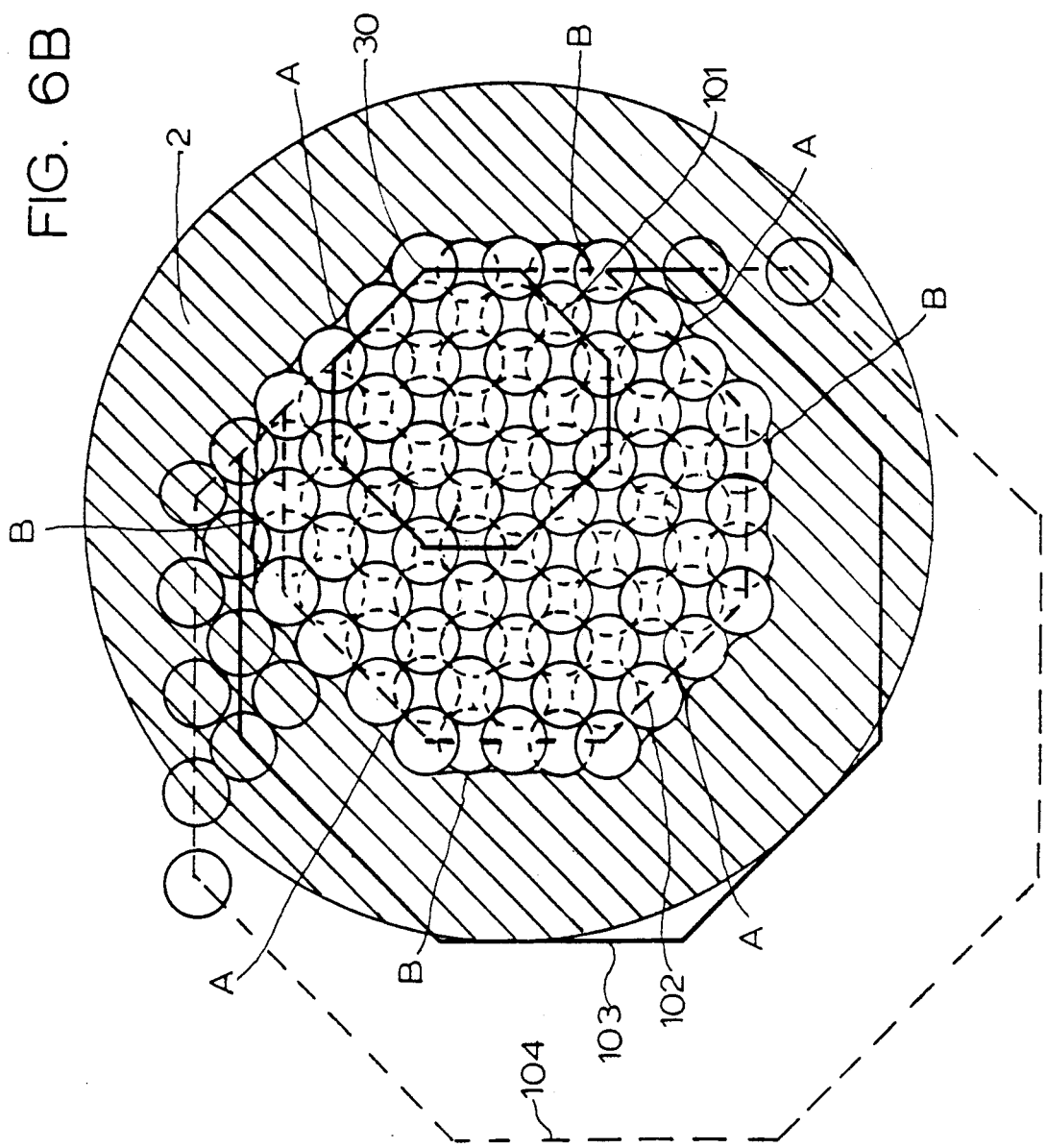

NUCLEAR REACTOR OF A BALL-BED TYPE FOR BATCH-WISE USE OF CORE FUEL BALLS REPLACED BY A NEW BATCH AT RELATIVELY LONG INTERVALS

This application is a continuation of application Ser. No. 07/279,312, filed Dec. 1, 1988(abandoned); which is a continuation of Ser. No. 07/018,406, filed Feb. 25, 1987 (abandoned); which was a division of Ser. No. 06/777,353, filed Sept. 18, 1985, now U.S. Pat. No. 4,695,423.

This invention converns a method for loading a nuclear reactor of the ball-bed type, sometimes known as a pebble-bed reactor, with balls of different fissionable material content.

An important characteristic of the ball-bed reactor consists in the possibility of continuously withdrawing balls out of the reactor, i.e., to sluice them out of the pressure container. New spherical elements are supplied through loading tubes in the cover reflector. Loading and unloading takes place continuously or quasicontinuously under full power operation of the reactor. The time intervals between two loading operations are made so short that no substantial reactivity fluctuations appear which would have to be compensated by supplementary neutron absorbing material. These intervals are in the range between a few seconds and a few days.

In such reactors a favorable power-density distribution and a high efficiency can be obtained. The removal of fuel elements under full power operation, however, requires apparatus involving relatively expensive technology. The pressure container needs to have as additional height of about 1 to 2 meters in order to contain the funnel-shaped downward ball guide, the ball separating device and the pressure lock commonly referred to as a sluice. These devices are difficult of access for repair. The installations for drawing off the unloaded highly radioactive elements involve expensive construction, since the handling must be remotely manipulated and must take place under heavy shielding. The operation and maintenance of the unloading systems and devices, as well as the continual transporting away of the fuel elements, require continuous presence of qualified personnel.

Reactor types other than the ball-bed reactor type are known to have a discontinuous mode of loading at particular intervals, for example several days or weeks every year of shutting down the reactor, cooling it down and relieving it of pressure in order to change the fuel elements. In the operating cycle between two loading operations, supplementary neutron absorbers must be inserted in order to equalize the reactivity change caused by burning down of the fuel. Supplementary control rods, boric acid in the cooling medium or neutron absorbing materials that burn up find application for this purpose. The introduction of these absorber materials load down the neutron economy, resulting in the conversion or breeding rate being reduced, and it brings a certain safety risk into play by the possibility of an erroneous removal from the reactor.

SUMMARY OF THE INVENTION

It is an object of the present invention to provide a reactor loading method and operation in which both the economic disadvantages and the risks of the known batch operation loading are avoided and the use of a complicated system of sluicing out elements from a reactor that is developing power can be avoided.

Briefly, the unloading of the balls is discontinuous and the loading of the reactor with fuel elements takes place with a partial loading of the cavern at the beginning with fuel elements of relatively high fissionable material content for reaching criticality and the contemplated power development; with increasing burn up of the fuel elements, loading is performed continuously or quasi-continuously for compensation of the diminishing fissionable material content in the core. In particular this is done until complete filling of the cavern.

A ball-bed reactor suitable for such loading is distinguished by its design for the initial partial loading followed by subsequent supplemental loading in a manner dependent upon the burning up of the fuel.

In particular it is advantageous to provide between $\frac{1}{4}$ to $\frac{5}{8}$, preferably $\frac{1}{3}$ of the core with the initial partial loading.

It is further preferable that the lower two-thirds of the initial partial loading should have less (e.g. about 12%) fissionable material content and the upper third higher (e.g. about 24%) fissionable material content than is necessary on the average for the critical mass of the initial partial loading.

It has also been found desirable for the fissionable material content of the elements subsequently loaded to be higher by a factor of 1.5 to 2.5, preferably about 1.9, than the average fissionable material content of the elements of the initial partial loading.

It is also advantageous for the core unloading to take place from above.

The long-term residence of fuel balls in the inventive reactor brings about a compacting of the ball bed involving mechanical stresses on the side wall. The same problem arises also under every batch-load operation of any ball-type nuclear reactor.

It is advantageous to have an indented floor for support of the core loading arrangement, preferably with a square grid arrangement of the indentations and a minimum indentation spacing (cross point spacing) which is greater than the fuel element ball diameter particularly by from 1 to 70%, preferably about 5%. The cavern of the reactor can conveniently have a polygonal cross-section of $2^n$ corners where $n=2, 3, 4, \ldots$, having an edge dimension which is an integral multiple of the fuel element ball diameter. An embossing or ribbing of the interior wall of the reactor cavern can advantageously be provided to fit a desired ball stacking arrangement.

Alternatively for a reactor with a random packing of the fuel elements the reactor cavern can desirably have cross-section which increases from the bottom upwards. It may desirably have a frustoconical peripheral surface with an inclination of between 15° and 45° to the vertical, preferably about 25°. The lower third of the peripheral surface just mentioned may advantageously have an angle of inclination of about 45° to the vertical and the upper two-thirds an angle of inclination of about 25° to the vertical.

Alternatively, in vertical section, the cavern inner wall advantageously satisfies the equation $R = R_o - a(Z - Z_o)^2$, where $R$ is the perpendicular spacing of the wall from the central axis of the core cavern, $R_o$ is the spacing of the wall from the central axis at the top surface of the ball bed, $Z$ is the height position, $Z_o$ is the height position at the surface of the ball bed and $a$ is a factor representing the permissible loading of the wall.

It can be advantageous to provide graphite columns or ribs in the core cavern for housing neutron absorbers for shutting down and control.

In this manner of loading the first loading is so measured out that criticality ($K_{eff}=1$) is already obtained under the power conditions contemplated for the reactor as soon as the core cavern is partly filled with fuel elements to some particular extent, for practical purposes, between ¼ full and ⅔ full, and preferably to the level of ½ full. During the following period of operation of the reactor, fresh fuel elements are then continuously or quasi-continuously added to the filling. This is done to the extent that is necessary for maintaining the criticality conditions. When the reactor cavern is finally filled up full, the closing down, cooling down and release of pressure of the reactor are carried out and all fuel elements are unloaded in one operation. Such an unloading can take place after about 2 to 5 years of operation. In the case of reactors of low power density, which are intended for heating plants, unloading can take place after 15 to 30 years of operation.

For the complete unloading, a ball removal device at the bottom of the core is useful but is not strictly necessary. Instead thereof the core cavern can also be emptied from above means of a mechanical conveyor or by suction lifting. The unloading equipment can be installed successively for unloading different reactors which are operated in this fashion. Its manufacturing costs are then correspondingly distributed to the energy costs of several reactors. The same holds for the operation and personnel costs involved in the operation and maintenance of these occasionally installed equipments.

In this manner of reactor loading, the unloading of the fuel elements is found to be substantially simpler than in the case of conventional loading, since the reactor is shut down, cold and without pressure. At the same time, however, the advantage of the ball-bed reactor compared to other reactors is preserved, namely the advantage that no absorber material needs to be inserted in the reactor in order to restrain any excessive reactivity resulting from the burning down cycle.

For economic reasons, it is to be desired that with this new manner of loading the same thermal power can be developed as in the case of operation of the reactor in a conventional manner of loading. Since the initial filling fills up the core cavern only in part, the average power-density in the initial condition must be correspondingly magnified compared to a full core cavern. In order to prevent in this case the exceeding of the permissible power per fuel element (5.7 KW per ball), a spatial distribution of the power-density that is as uniform as possible is sought in the volume of the cavern that is filled with balls. This is obtained by using for the initial loading at least two different fuel element types having respectively different fissionable material content. In the design example described below, the lower two-thirds of the "initial filling" is provided with elements having a fissionable material content lower by 12% than the average value, the upper third with elements with 24% higher fissionable material content relative to the overall average value.

It is also to be desired for reasons of economy that in the unloading of the core the burnt down condition is on the average comparable with the burning down condition obtained (70-100 MWd/Kg$_{HM}$ (megawatt days per kilogram of heavy metal)) in the case of reactors loaded in the conventional way. Design calculations show that this can be obtained when the average fissionable material content in the fuel elements subsequently loaded is higher by a factor of 1.9 than the average fissionable material content of the initial partial filling.

In computer simulation of the slow filling up of the reactor with elements of a single value of fissionable material content, it has been found that the necessary filling up rate for fresh elements per day becomes smaller towards the end of the operating period and that, on the other hand, the maximum power loading of the balls is relatively high at the beginning and towards the end. In order to counteract the situation, balls of different fissionable material content could be added also in the loading that follows the initial loading. A predictive computer simulation can work out the most favorable fuel element loadings and fissionable material contents.

One of the results of the reactor loading system of the present invention, with its core remaining undisturbed for a long period of time in contrast to the continuous fuel ball circulation of conventional ball-bed reactors, is a gradually increasing density of fuel balls (i.e. increase of the number of balls per unit volume). Control and shut-down rods are therefore advanced into the surrounding reflector in the case of small reactors and, in the case of larger reactors, which can no longer be controlled by adjustments of the graphite reflector, one or more columns or rib-shaped graphite inserts are preferably provided, into which a neutron absorber can be introduced. The construction of such columns for a reactor designed for the practice of the present invention is substantially simplified compared to such construction in conventional ball-bed reactors, since no continuous movement of the ball bed towards the exit channels takes place and all the force effects connected therewith are eliminated.

Since the balls in the core remain stationary for a relatively long period in the practice of the present invention, it is desirable to charge the reactor slowly and to provide additonal procedures and means to produce, so far as possible, an ordered filling of the reactor cavern with fuel balls, in order to obtain a dense packing of the balls, high power-density and uniform distribution of the pressure loading on the balls in the reactor. Such an ordered filling can be stably supported by a core cavern floor having square grid cross-point indentations or dipps. Then by filling the cavern with balls beginning with the lowest layer an ordering of the balls can be produced that is one of the best possible. In order to take account of ball expansions as the result of thermal behavior and burning down over the service life of the fuel element, the indented floor should preferably have minimum indentation spacing that is slightly greater than the ball diameter, and more particularly a spacing greater by 1 to 70%, preferably about 5% than the mean or nominal diameter of the balls.

The square grid indentation pattern has the advantage over the supposedly optimal hexagonal arrangement of balls on the bottom that when the first layer of balls is covered with more balls, the only positions preferred by the incoming balls are positions actually intended for the next layer, in each case centered over four balls of the underlying layer. In that way the filling of the core automatically and without the necessity of constraint uses the best possible ordering state with maximum spatial density of the balls, which when considered in layers inclined at 45° form a maximum density hexagonal packing with a theoretically obtainable filling factor of 0.74.

In a cylindrical cavern the noticeable mismatches between ball diameter and cavern diameter still allow a certain amount of disorder in the neighborhood of the wall of a cavern to appear tolerable. If desired, however, the cavern cross-section and its internal wall can be constructed to fit the ordered stacking of the balls. Thus the diameter of the peripheral wall can be dimensioned as a corresponding integral multiple of the ball dimension and be equipped with perpendicular ribs so that ordered ball positions can be provided also adjacent to the wall. In order to mitigate an undesired fostering of ball positions in the edge region that are inherently unstable (e.g., arrangement of a ball of the offset layer immediately above the highest point of a ball of the underlying layer), the radii of curvature of the grooves between the ribs are greater than the ball radius, as can be seen in FIG. 4 of the drawings described in detail below. FIG. 4 shows as an example a horizontal (partial) cross-section of an octagonal core that is bounded, as required by this arrangement, by two different types of walls A and B. Type A is preferably equipped with perpendicular ribs of the kind shown, while type B can be either smooth or equipped with perpendicular ribs as illustrated.

The necessary rib structure for rectangular cavern cross-section or in general for polygonal cross-section with an even number of sides and corners is similarly quite simple. In general, a suitable wall structure results from the selected ground plan of the cavern and the ordered ball filling inscribed therein essentially as the enveloping wall for the two mutually offset layers of balls.

Load relief for the side walls, such as can be obtained with an ordered filling of balls with lateral play, can also be obtained for the statistical packing of balls by means of a core cross-section that increases from the bottom upwards, as indicated in FIG. 5. In such a case, a frusto-conical side wall surface with an inclination to the vertical (angle $\alpha$) between 15° and 45°, preferably of about 25°, can be provided (FIG. 5a).

It is still more favorable to make the inclination angle greater in the lower core regions, for example in the lower third, than in the upper region (see FIG. 5b), in which case an angle of about 45° in the lower region and of about 25° in the upper region are particularly preferred.

The optimum configuration is obtained by bowing out the vertical section of the core cavern in such a way that the vertically effective components of the force on the container wall are equally great at all heights. This is obtained by shaping the cavern cross-section with respect to the height level approximately in accordance with the equation $R = R_o - a(Z - Z_o)^2$, as illustrated in FIG. 5c. In this equation R signifies a spacing of the wall from the central axis of the core cavern, $R_o$ the radius at the subsurface of the ball bed, Z the height position or level, $Z_o$ the height position or level at the surface of the ball-bed, while a calculates out as a proportionality factor corresponding to the permissible loading of the wall.

The importance of the subject matter of the foregoing three paragraphs should not be underestimated, even though FIG. 1, in order to simplify the explanation of the method of the invention, does not incorporate the important features discussed above in connection with FIGS. 5a, 5b and 5c.

In the reactors of the present invention, ball-bed cores are operated in the mechanically quiescent state, with the advantage already mentioned above. Not only in the practice of the method of the invention above described, but in any conceivable batch operation of a mechanically quiescent ball-bed or nuclear reactor, the forces resulting from expansion of the fuel balls, as the result of thermal and radiation effects, have a vertical component against which the weight of the bed above the place of expansion acts as an opposing force, and also a horizontal, component that results in loading of the lateral walls.

As above described, therefore, the aspect of the invention now discussed provides for limiting the pressure forces impinging on the lateral wall surfaces of the core container, and accomplishes that in two ways, first by the shaping of the cavern as described in connection with FIGS. 5a, 5b and 5c and, second, by the provision of an indented floor with indentations at the cross-points of a square grid pattern with a minimum cross-point spacing slightly larger than the ball diameter so as to maintain an ordered arrangement of the balls.

This loading can be reduced by disposing the lateral wall obliquely as shown in FIG. 5a. If the inclination to the vertical (angle $\alpha$) is sufficiently large, the output pressure against the wall results in producing a component of force directed upwards parallel to the wall. As already explained, the configuration of FIG. 5b makes still better use of this principle. Finally, the configuration explained with reference to FIG. 5c shows an optimal configuration in which the vertically operating components of the force on the container wall are the same at all levels of the ball bed.

Finally, it should again be noted that the prevention of excessive forces on the lateral walls of the cavern as the result of expansion of the fuel balls can also be accomplished by filling the fuel balls in such a way that they stack themselves in an ordered array providing a small amount of horizontal play, this being brought about essentially by the indentations in the cavern floor located at the cross-points of a square grid having a minimum spacing between cross-points, such that there is 1 to 8% play between the fuel balls of the bottom layer that come to rest in the indentations, and likewise of the layers thereabove which come to rest in positions centered above four balls of the immediately underlying layer. The arrangement that results has the further advantage of providing a high power-density in the core and uniform distribution of pressure loading on the balls and walls of the core.

The features discussed with reference to FIG. 4 likewise lead to uniform distribution of pressure in response to expansion forces generated in the fuel balls.

BRIEF DESCRIPTION OF THE DRAWINGS

The invention is further described by way of illustrative example with reference to the annexed drawings, in which:

FIG. 4 is a partial imaginary bottom view of an octagonal core such as might be seen through a transparent cavern bottom, with a first offset ball layer resting on top (i.e. behind) of the lowest ball layer;

FIGS. 5a, 5b and 5c are schematic cross-sectional views of an initial filling in a reactor having a cross-section that widens from the bottom upwards;

FIG. 6A is an extension of FIG. 4 showing a cross-section of a core cavern in which, for purposes of illustration, the size of the balls has been magnified relative to the cavern dimensions and which shows an imaginary bottom view looking up on an array of 52 balls on the cavern floor;

FIG. 6B shows the development of progressively larger octagonal arrays like FIG. 6A, beginning with a minimum array of 21 balls.

DESCRIPTION OF THE ILLUSTRATED EMBODIMENTS

Figure 1:
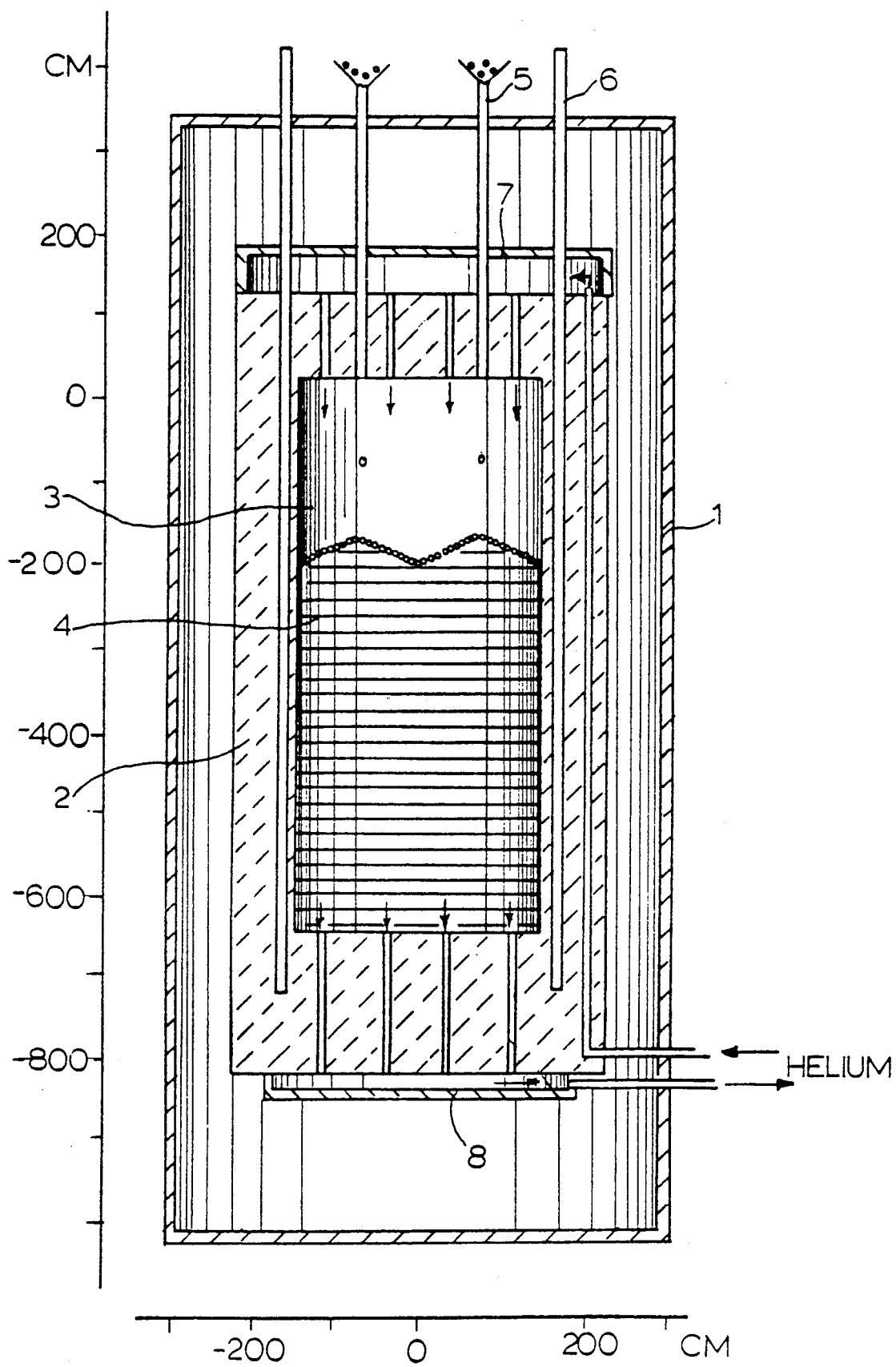
FIG. 1 is a schematic representation of a cylindrical container of a ball-bed nuclear reactor in accordance with the invention.
Figure 2A:
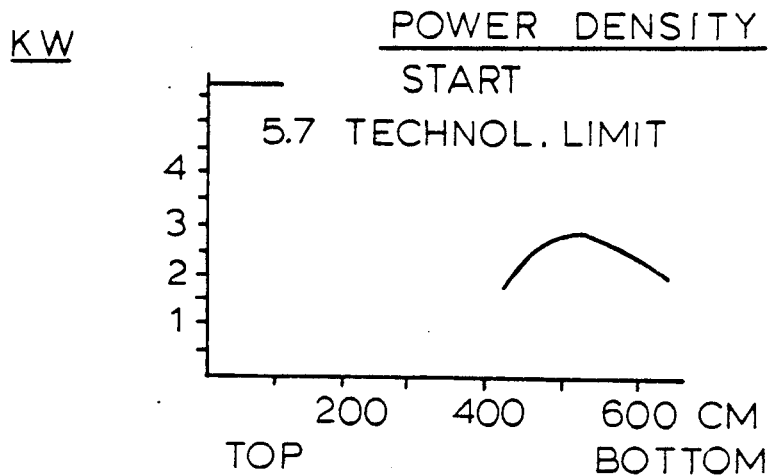
FIGS. 2a, 2b and 2c are graphs showing power-density at various levels respectively at the start, after 321 days and after 611 days.
Figure 2B:
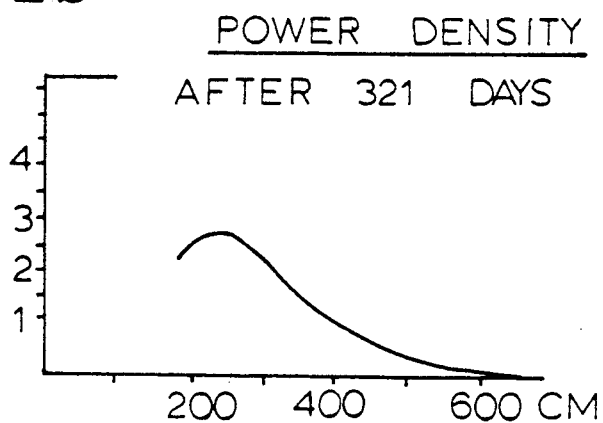
Figure 2C:
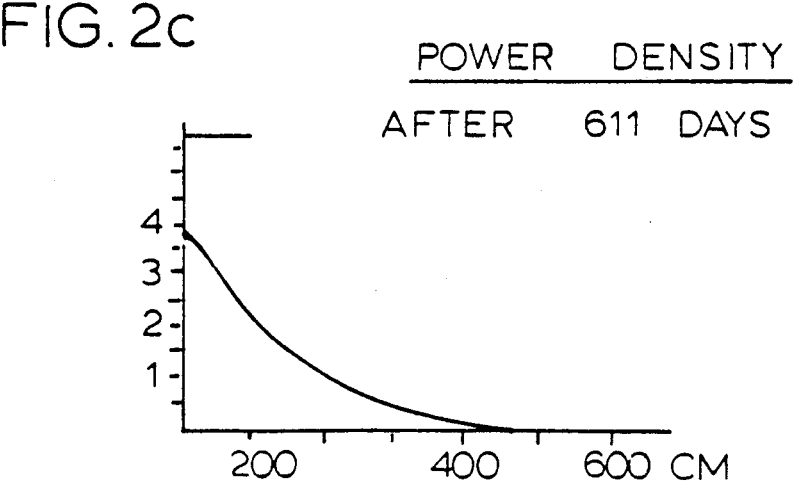
Figure 2D:
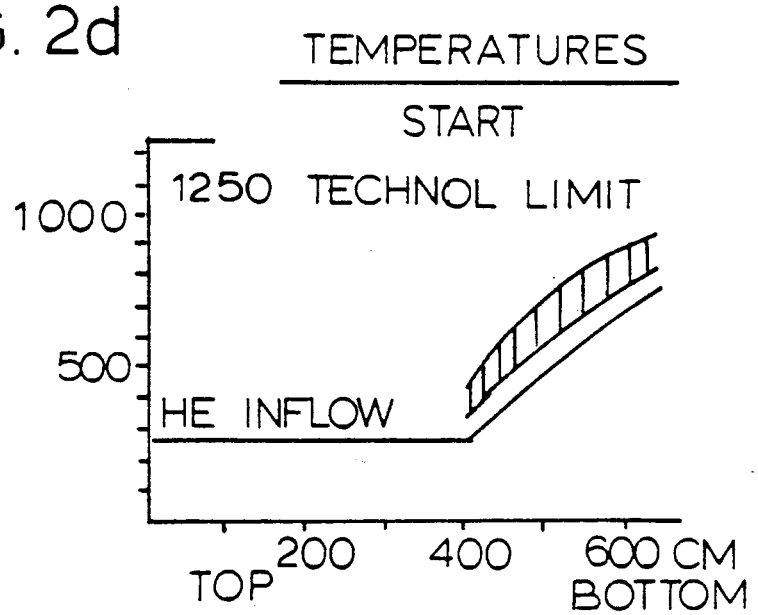
FIGS. 2d, 2e and 2f are graphs of temperatures at the helium inlet, at the top surface of the ball-bed and at the center of the latter respectively at the start, after 321 days and after 611 days.
Figure 2E:
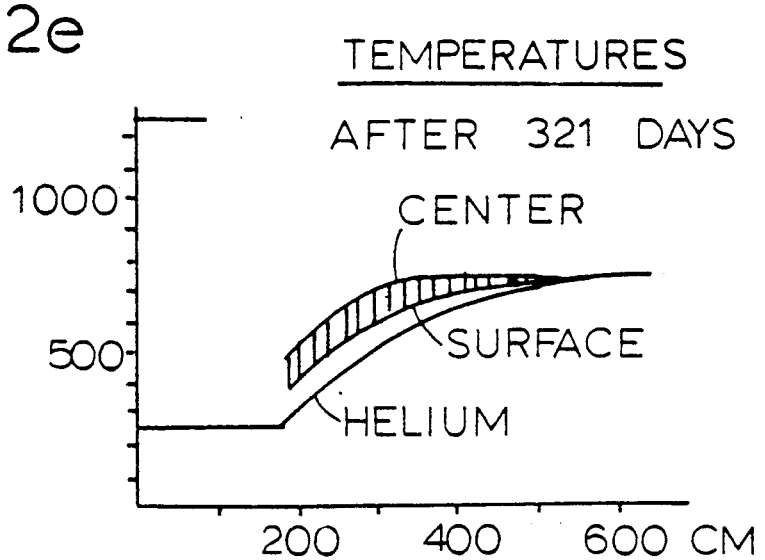
Figure 2F:
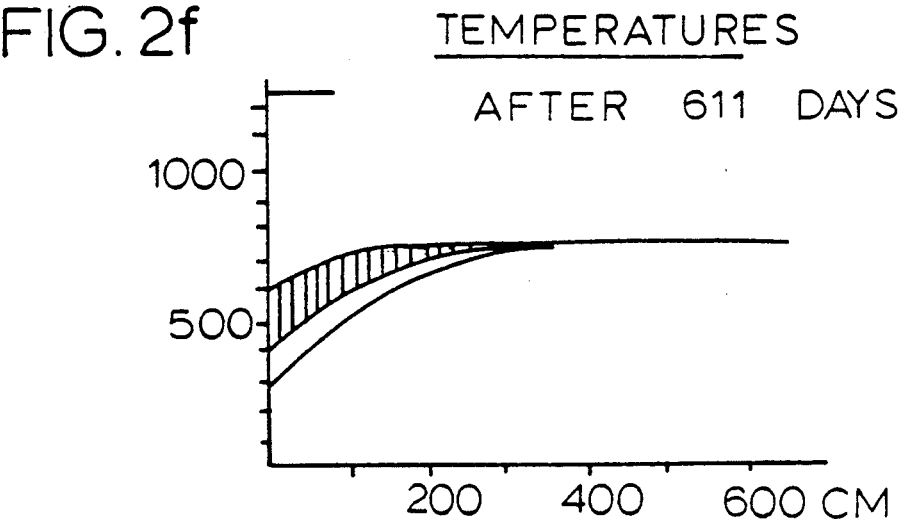

As shown in FIG. 1, there are located in the pressure vessel 1 a graphite reflector 2 surrounding a cavernous space 3 into which a bed of fuel element balls 4 is filled. The latter are loaded and unloaded by means of loading and unloading tubes 5. Control rods 6 are provided in the reflector. The ball bed is cooled by helium that flows in below, then upward through the reflector side walls to an upper gas gathering chamber 7, thence into the empty part of the cavern 3, down through the ball bed 4 and the reflecting floor to a lower chamber 8 for collecting hot gas, from which it is drawn out by suction. An opposite gas flow direction is also possible.

The core cavern has a volume of 46 m³ and the thermal power produced amounts to 200 megawatts. The helium cooling medium flows downwards and is heated from 250° C. to 700° C. The fuel elements, of a diameter of 6 cm contain $UO_2$ as fuel in the form of "coated particles". In the initial loading ⅓ of the core cavern is filled with fuel elements. The lower 2/9 are loaded with balls with 5% uranium enrichment and above them the remaining 1/9 of the cavern that is initially filled is loaded with balls with 7% uranium enrichment. Under these conditions criticality is reached. During power-producing operation fuel elements with 10.7% enrichment are added little by little. At the beginning the additional loading is at the rate of 350 balls per day and towards the end of the operating period that becomes 210 balls per day. This is determined out of the requirement of continuously maintaining the criticality of the reactor. After 611 days under full load, the reactor is completely filled and must be unloaded. The burning down is, on the average, 74 $MWd/Kg_{HM}$ and at the maximum 105 $MWd/Kg_{HM}$.

The power distribution in the axial direction is at first relatively uniform and symmetrical. In the course of filling up, the maximum is displaced to the upper region where the freshly added balls are found (see FIG. 2). The maximum fuel temperature varies during the operating period between 735° C. and 910° C., remaining thereby at all times substantially below the maximum permissible temperature of 1250° C.

Figure 7:
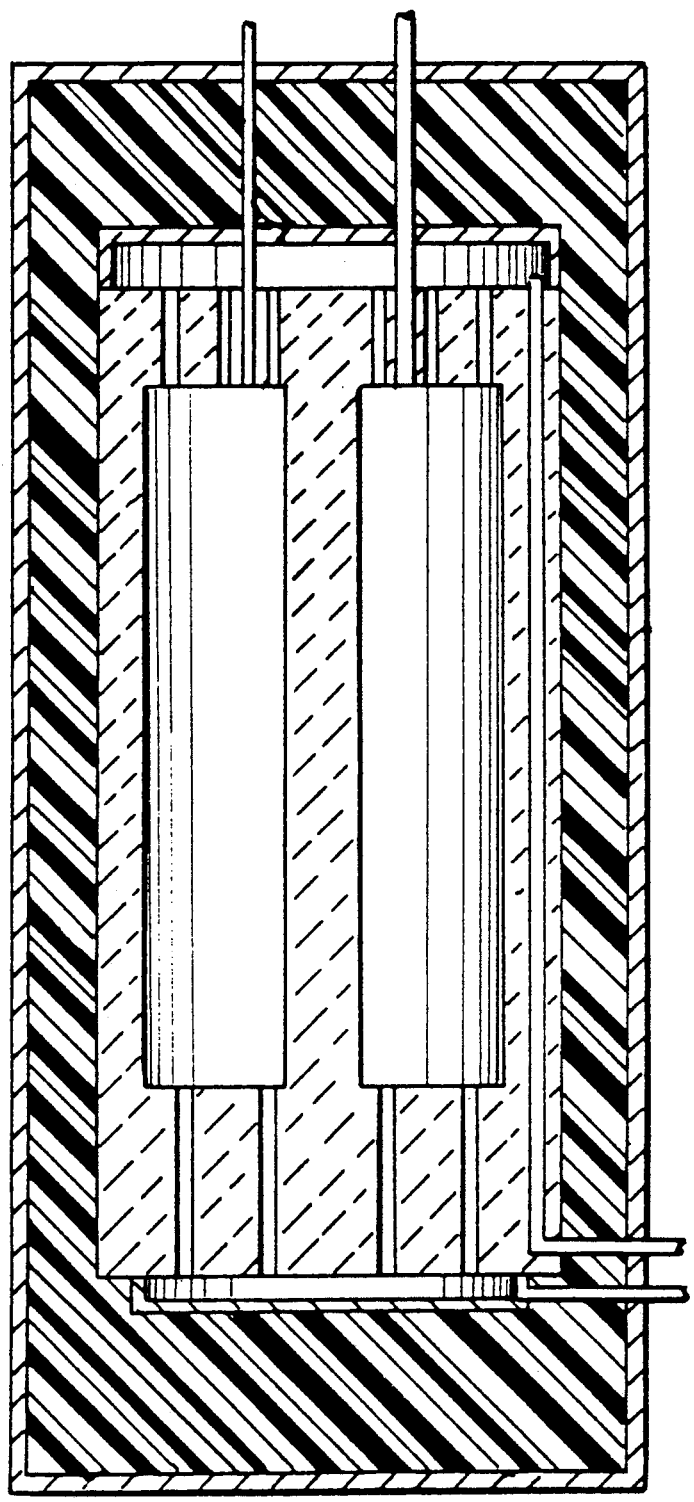
FIG. 7 is a diagram of a reactor having a graphite central column for diminishing the fuel element maximum temperature.

In a simulation of an accident in which it is assumed that helium escapes from the reactor, the calculation shows a maximum temperature of 2005° C. A change of the reactor design in which a graphite central column, as shown in FIG. 7 with control rods omitted, with a radius of 85 cm is provided and correspondingly magnified radius of the cavern by 22 cm has the result of diminishing the fuel element maximum temperature in such an accident down to 1430° C. In this reduced maximum temperature, diffusion of the fission products out of the coated particles is avoided.

FIG. 6A is an illustrative extension of FIG. 4 showing the bottom layer of fuel balls an imaginary bottom view, so that in broken lines the outline of the next higher layer, which is referred to as the offset ball layer in FIG. 4, can also be shown.

In connection with FIG. 4 it was mentioned that alternate sides of the octagonal cavern are differently shaped, some sides being of type A, shown with perpendicular ribs of rounded shape, producing a wavy profile, and other sides being of type B, having perpendicular ribs formed by the intersection of two circular arcs (see FIG. 4) or else being smooth. Of course in a pebble-bed reactor the fuel balls are small compared to the dimensions of the reactor cavern and that was a reason for FIG. 4 showing only the fuel ball pattern near one corner of the walls. In order to show the overall fuel ball pattern conveniently it is necessary to illustrate caverns containing layers of not more than 60 balls each, which means that the ratio of ball diameter to effective cavern diameter is exaggerated. As will be shown in connection with FIGS. 6B, as the size of the cavern increases relative to the ball size, the pattern remains the same and its characteristics can be expressed in terms applicable to any particular relative ball size.

Figure 3:
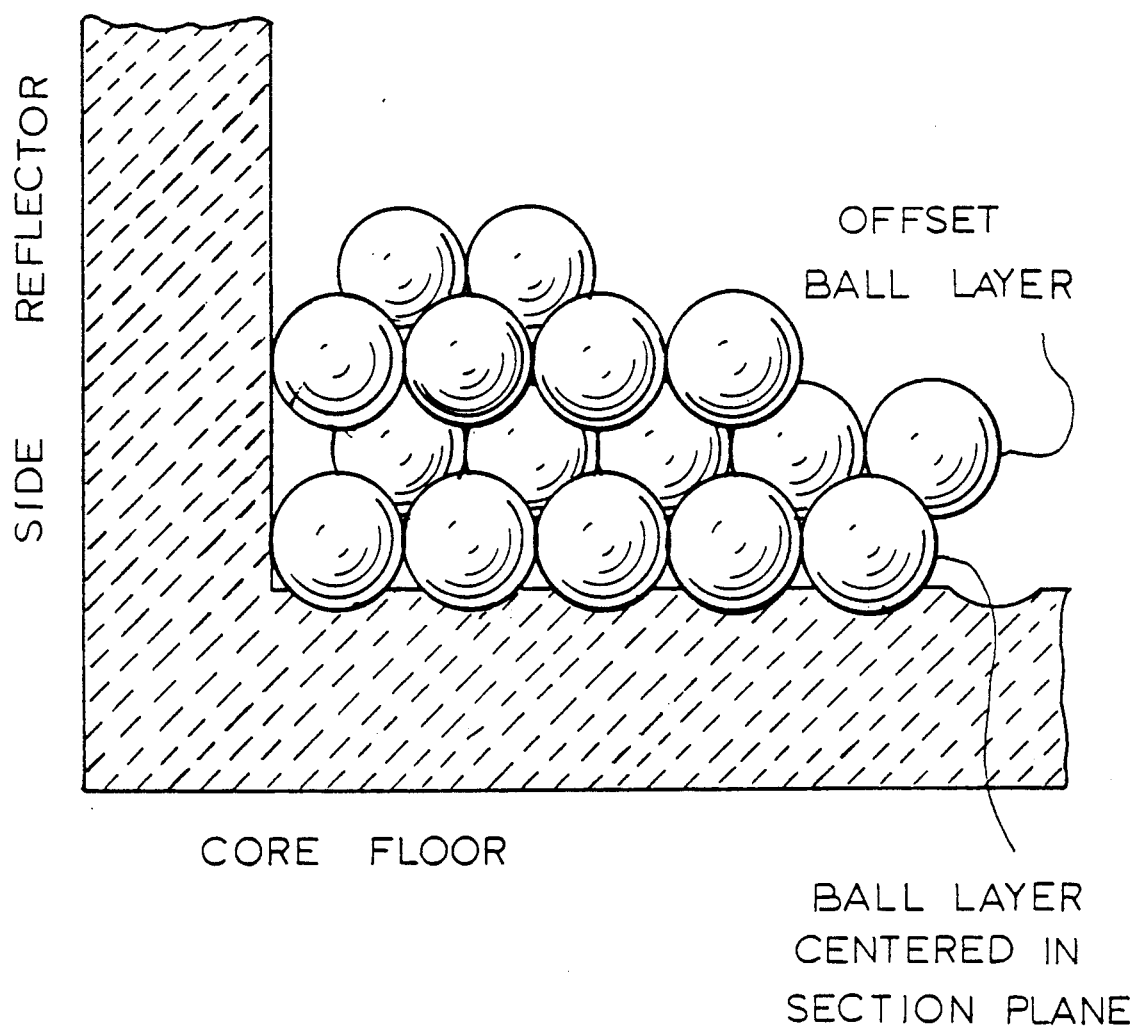
FIG. 3 is a schematic vertical section diagram showing a portion of an indented cavern floor, a portion of a cavern side reflector wall and a part of the ball-bed filling.

The cavern 3 is surrounded by the reflector 2. The solid-line circles represent the fuel balls of the bottom layer (see FIGS. 3 and 4) and the dotted circles of FIG. 6A represent the balls of the offset layer which rests on the bottom layer. The pattern of the bottom layer and of the offset layer repeat in alternation, upwardly from the bottom layer, as generally described in connection with FIGS. 3 and 4. In the case of FIG. 6A there are 52 balls in the bottom layer and 45 balls in the offset layer immediately above it. FIG. 6A shows that in the bottom layer all of the walls of the cavern are close to contact with the ball layer, thus supplementing, in the case of the bottom layer, the floor indentations shown in FIG. 3 for establishing the ball layer pattern. It will be seen from FIG. 6A that the balls of the offset layer are far from the type A walls of the cavern. It may further be observed that in the more numerous bottom layer and the other alternate layers like it, there are four balls closely packed adjoining the type A walls of the cavern and only three balls of the layer, widely spaced from each other, adjoining the type B walls of the cavern.

FIG. 6B is a drawing of FIG. 6A on which there has been superimposed a number of lines and circles showing how the rules of the pattern FIG. 6A can be generalized and, specifically, how they can be extended step by step either down to a minimum array defined by the octagon 101 composed of only 21 balls for the more numerous layers, or upward in number of balls as illustrated by the octagons 103 and 104. The octagon 102 shown in broken lines defines the array of the bottom layer in FIG. 6A. It does not enclose that array, since that would be difficult to draw in a manner distinct from the walls of the cavern, but it passes through the centers of the outermost balls of the array. This type of designation is chosen merely for simplicity of illustration. For further simplification of the illustration, octagons defining arrays of progressively larger sizes are shown alternately by solid and broken lines and all of them are drawn having a common corner 30.

The smallest octagon 101 defines an array that has two balls on every type B side and three balls on every type A side. The array of FIG. 6A, which is defined by the broken line octagon 102 in FIG. 6B, as already mentioned, has four balls on every type A side of the cavern and three balls along every type B side of the cavern (the corner balls being included in both these counts). The next larger array of this kind has 5 balls on every type A side and 4 balls on every type B side. Similarly the layer of balls defined by the bigger broken line octagon 104 has six balls on every type A side and 5 balls on every type B side.

If now the largest number of balls found along one wall in one of the layers of the filling of a reactor of this kind is represented by n, this being a maximum since it is a close-packed line of balls, then the number of balls adjoining each type B wall will be n−1 and in the offset layers, which have fewer balls, the number of balls adjoining the type B layers will be n−2 and none of the balls of the offset layer will touch the type A walls. In the offset layers the row of balls parallel to and nearest the type A walls will consist of n+1 balls, as can be seen from FIGS. 6A and 6B.

Although the invention has been described with reference to a particular illustrative example, it will be understood that variations and modifications are possible within the inventive concept.

We claim:

1. A ball-bed nuclear reactor of a design for operation with a stationary bed of fuel balls to which fuel balls are added during operation of the reactor, comprising a core chamber enclosed by a reflector structure within a pressure vessel, said reflector and pressure vessel having passage means for facilitating the flow of a cooling gas through said core chamber and having passages within which control rods can be adjustably positioned vertically with respect to said core chamber for control or shut-off of output power of said reactor, said reactor further comprising:

core chamber floor portions of said reflector structure having cavities of substantially spherical curvature for inducing fuel balls, all of the same diameter and loaded into said core chamber from above, to take up stationary positions in said reactor in an ordered array in which those of said fuel balls which are at the same vertical level in said reactor are out of direct contact with each other before they begin to expand in the course of a reaction in said chamber, the upper surface of said floor portion of said reflector, except for said cavities, being substantially horizontal;

interior wall portions of said reflector structure having rounded indentations for accommodating fuel balls of said ordered array and providing restraint of movement of said balls horizontally along said walls out of said ordered array, and means for adding fuel balls to said chamber while said reactor is in operation.

2. Reactor according to claim 1, wherein said cavities of said chamber floor portion of said reflector structure are centered at the cross-points of an imaginary horizontal square grin in which the minimum spacing of said cross-points is greater than said fuel ball diameter by an amount sufficient to provide a clearance between adjacent fuel balls which is sufficient to compensate for fuel ball expansion over the useful life time of said fuel balls.

3. Reactor according to claim 2, wherein said minimum cross-point spacing is greater than said fuel ball diameter by between 1% and 10% of said diameter.

4. Reactor according to claim 2, wherein at all levels usable for a filling of fuel balls therein, said core chamber has a horizontal cross-sectional contour which is in the shape of a polygon having an even number of sides, each side having a lateral dimension suited to accommodate a number of fuel balls fitting into said rounded indentations of said interior wall portions of said reflector structure at the respective sides of said polygon, with said fuel balls being spaced horizontally along said wall portions according to their positions in said ordered array.

5. Reactor according to claim 4, wherein said cross-section contour of said core chamber is octagonal and said core chamber has the shape of a octagonal prism and said rounded indentations are vertically running channels of rounded cross-section running between vertical ribs, with a said rounded channel running along each of the corner edges of said hexagonal prism, spaced so that in a first set of alternate planes of vertically stacked planes of balls in said ordered array, four interior walls of said reflector structure, each separated from the other two by another interior wall of said reflector structure, can accommodate n fuel balls of said ordered array in adjacent rounded channels and each of the remaining four interior walls of said reflector structure can accommodate n−1 fuel balls of said ordered array in alternate rounded channels, while in the second set of alternate planes of said vertically stacked planes, n−2 fuel balls can be accommodated in alternate rounded channels of the walls that accommodate n−1 fuel balls of each horizontal plane of said first set of alternate planes, while the remaining interior walls of said reflector structure, each of which accommodates n fuel balls of said first set of alternate planes, are out of contact with fuel balls of said second set of alternate planes.

6. A ball-bed nuclear reactor of a design for operation with a stationary bed of fuel balls to which fuel balls are added during operation of the reactor, comprising a core chamber enclosed by a reflector structure within a pressure vessel, said reflector and pressure vessel having passage means for facilitating the flow of a cooling gas through said core chamber and having passages within which control rods can be adjustably positioned vertically with respect to said core chamber for control or shut-off of output power of said reactor, said reactor further comprising:

core chamber floor portions of said reflector structure having cavities of substantially spherical curvature for inducing fuel balls, all of the same diameter and loaded into said core chamber from above, to take up stationary positions in said reactor in an ordered array in which those of said fuel balls which are at the same vertical level in said reactor are out of direct contact with each other before they begin to expand in the course of a reaction in said chamber, the upper surface of said floor portion of said reflector, except for said cavities being substantially horizontal, interior wall portions of said reflector structure rising from said floor portion at an oblique outward angle for at least most of their height and having rounded indentations for accommodating fuel balls of said ordered array and providing restraint of movement of said balls horizontally along said walls out of said ordered array, and means for adding fuel balls to said chamber while said reactor is in operation.

7. Reactor according to claim 6, wherein the contour of said floor portion is essentially circular and wherein the obliquely rising parts of said wall portions of said reflector structure enclose at least one frusto-conical portion of said core chamber having a wall inclination to the vertical which is between 15° and 45°.

8. Reactor according to claim 7, wherein said inclination to the vertical is approximately 25°.

9. Reactor according to claim 7, wherein lower third of said wall portions of said reflector structure are inclined at about 45° to the vertical and the upper ⅔ thereof are inclined at an angle of about 25% to the vertical.

10. Reactor according to claim 7, wherein said wall portions of said reflector structure in the shape of a surface of revolution having a central vertical axis and the vertical profile of said wall portions approximately satisfies the equation $R = r_o - a(Z - Z_o)^2$, wherein R is the spacing of the wall from a central vertical axis of said core chamber measured in a direction perpendicular to said axis and $R_o$ is said spacing at the upper surface of the maximum ball bed filling of said core chamber, Z is the height from the bottom of said core chamber of which the radius spacing R is measured, $Z_o$ is the height of said top surface of the maximum fuel ball filling of said core chamber and a is a proportional factor determined by the permissible wall loading of the reactor.

11. A ball-bed nuclear reactor having a reactor core chamber enclosed by a reflector structure within a pressure vessel having top, bottom and lateral pressure walls, said reflector and pressure vessel having passage means for facilitating the flow of a cooling gas through said core chamber and having passages within which control rods can be adjustably positioned with respect to said core chamber for control of or shut-off of power output of the reactor, said reactor further comprising:

first means for controlling the vertical position of said control rods for power output and shut-off control of said reactor regardless of the level to which fuel balls may fill said core chamber of said reactor;

second means for circulating said cooling gas through said reactor for control of reactor temperature regardless of the level to which fuel balls may fill said core chamber of said reactor, and third means, of a construction which enables said third means to be operable while said reactor is in heat-generating operation, for causing fuel balls to pass intermittently, from the exterior of said pressure vessel to an upper region of said core chamber of said reactor, through said top pressure wall of said pressure vessel and for permitting fuel balls thereby introduced into said upper region of said core chamber to reach, by gravity, a rest position in said core chamber, said reactor being devoid of any means, of a construction which enables said means to be operable while said reactor is in heat-generating operation, for providing passage of fuel balls intermittently between said core chamber and the exterior of said pressure vessel other than said means for causing fuel balls to pass through said top wall of said pressure vessel, whereby said reactor may be used to generate usable heat over a cycle exceeding a year in length without interruption of operation of said reactor, beginning with a partial filling of said chamber by said fuel balls before initiation of a reaction in said reactor and ending after a period of operation of said reactor with a substantially complete filling of said fuel balls in said chamber.

12. A ball-bed nuclear reactor according to claim 11 further comprising:

core chamber floor portions of said reflector structure having cavities of substantially spherical curvature for inducing fuel balls, all of the same diameter and loaded into said core chamber from above, to take up stationary positions in said reactor in an ordered array in which those of said fuel balls which are at the same vertical level in said reactor are out of direct contact with each other before they begin to expand in the course of a reaction in said chamber, the upper surface of said floor portion of said reflector, except for said cavities, being substantially horizontal;

interior wall portions of said reflector structure having rounded indentations for accommodating fuel balls of said ordered array and providing restraint of movement of said balls horizontally along said walls out of said ordered array, and means for adding fuel balls to said chamber while said reactor is in operation.

13. Reactor according to claim 12, wherein said cavities of said chamber floor portion of said reflector structure are centered at the cross-points of an imaginary horizontal square grid in which the minimum spacing of said cross-points is greater than said fuel ball diameter by an amount sufficient to provide a clearance between adjacent fuel balls which is sufficient to compensate for fuel ball expansion over the useful life time of said fuel balls.

14. Reactor according to claim 13, wherein said minimum cross-point spacing is greater than said fuel ball diameter by between 1% and 10% of said diameter.

15. Reactor according to claim 14, wherein at all levels usable for a filling of fuel balls therein, said core chamber has a horizontal cross-sectional contour which is in the shape of a polygon having an even number of sides, each side having a lateral dimension suited to accommodate a number of fuel balls fitting into said rounded indentations of said interior wall portions of said reflector structure at the respective sides of said polygon, with said fuel balls being spaced horizontally along said wall portions according to their positions in said ordered array.

16. Reactor according to claim 15, wherein said cross-section contour of said core chamber is octagonal and said core chamber has the shape of a octagonal prism and said rounded indentations are vertically running channels of rounded cross-section running between vertical ribs, with a said rounded channel running along each of the corner edges of said octagonal prism, spaced so that in a first set of alternate planes of vertically stacked planes of balls in said ordered array, four interior walls of said reflector structure, each separated from the other two by another interior wall of said reflector structure, can accommodate n fuel balls of said ordered array in adjacent rounded channels and each of the remaining four interior walls of said reflector structure can accommodate n−1 fuel balls of said ordered array in alternate rounded channels, while in the second set of alternate planes of said vertically stacked planes, n−2 fuel balls can be accommodated in alternate rounded channels of the walls that accommodate n−1 fuel balls of each horizontal plane of said first set of alternate planes, while the remaining interior walls of said reflector structure, each of which accommodates n fuel balls of said first set of alternate planes, are out of contact with fuel balls of said second set of alternate planes.

17. A reactor according to claim 11, wherein said lateral and bottom pressure walls of said pressure vessel are imperforate except for at least one passage of said means for circulating said cooling gas through said lateral pressure wall of said vessel.

18. A nuclear reactor for uninterrupted operation over a predetermined period of time comprising,
 (a) a pressure vessel (1) having top, lateral and bottom pressure walls;
 (b) a graphite reflector (2) within said vessel
 (c) gas flow means within said reactor for removing heat from said reactor, equipped with means for providing passage of gas flow through said pressure vessel;
 (d) core space means (3) within said reflector for receiving an initial charge of fuel ball elements sufficient for establishing a nuclear reaction while requiring a predetermined initially empty volume of space therein (4), said core space means having a volume larger than said predetermined volume by at least one-and-one-half times the predetermined volume;
 (e) means for preriodically adding (5) fuel ball elements to said core space means, said adding means being of a construction enabling said means to be operable under temperature, pressure and nuclear fission conditions of heat-generating operation of said reactor, without interrupting operations of said reactor and being equipped with means for passage of said fuel ball elements through said top pressure wall of said pressure vessel and with means for permitting fuel balls after their passage through said top pressure wall to reach, by gravity, a rest position in said core space, and
said lateral and bottom walls of said pressure vessel being imperforate except for at least one passage of said gas flow means through said lateral wall.

19. A reactor according to claim 18 wherein the predetermined quantity of said initial charge is insufficient for said initial charge to produce a meltdown in said reactor in the event of a failure.

20. A reactor according to claim 18 including means for placing an initial charge to fuel ball elements into said reactor prior to starting any reaction therein, and wherein said core space means has a volume at least three times said predetermined volume.

21. A reactor according to claim 18 wherein said core space means has a volume at least three times greater than the predetermined value.

22. A reactor according to claim 18 having an initial charged placed therein which comprises a first load of two-thirds of the fuel ball elements of said initial charge with less fissionable material content, and a second load of one-third of the fuel ball elements of said initial charge with higher fissionable material content than is necessary on the average for the critical mass of the initial charge.

23. A reactor according to claim 18 wherein predetermined period is at least 2 years.

24. A reactor according to claim 23 wherein said period is at least 5 years.

25. A reactor according to claim 24 wherein reactor is of low power density and for use in heating plants, and wherein said period is not less than 15 or more than 30 years.

26. A reactor according to claim 18 having an initial charge placed therein in which a first two-thirds of said initial charge consists of fuel ball elements with about 5% uranium enrichment, and a second one-third of said initial charge consists of fuel ball elements with about 7% uranium enrichments.

27. A reactor according to claim 18 wherein said core space means is elongate in the vertical direction, approximately 6.5 meters high and approximately 3 meters across, with a volume of approximately 46 meters$^3$.

28. A reactor according to claim 18 wherein said core space means is elongate in the vertical direction, with a ratio of vertical length to the horizontal length which is at least 2 to 1.

29. A reactor according to claim 18 further comprising a graphite central column in said core space.

* * * * *